(12) United States Patent
Friess et al.

(10) Patent No.: US 10,738,839 B2
(45) Date of Patent: Aug. 11, 2020

(54) CLUTCH ASSEMBLY CONFIGURED TO PREVENT UNWANTED JOLT DURING ENGAGEMENT

(71) Applicant: ZF FRIEDRICHSHAFEN AG, Friedrichshafen (DE)

(72) Inventors: Johannes Friess, Michelau im Steigerwald (DE); Christoph Sasse, Schweinfurt (DE); Wolfgang Grosspietsch, Schweinfurt (DE); Angelika Ebert, Schonungen (DE); Axel Rohm, Schonungen (DE); Steffen Romeis, Gersfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 131 days.

(21) Appl. No.: 15/756,893

(22) PCT Filed: Aug. 1, 2016

(86) PCT No.: PCT/EP2016/068274
§ 371 (c)(1),
(2) Date: Mar. 1, 2018

(87) PCT Pub. No.: WO2017/036698
PCT Pub. Date: Mar. 9, 2017

(65) Prior Publication Data
US 2018/0252273 A1   Sep. 6, 2018

(30) Foreign Application Priority Data
Sep. 2, 2015   (DE) .................... 10 2015 216 731

(51) Int. Cl.
*F16D 13/69*   (2006.01)
*F16D 13/64*   (2006.01)
(Continued)

(52) U.S. Cl.
CPC .......... *F16D 13/69* (2013.01); *F16D 13/648* (2013.01); *F16D 13/52* (2013.01); *F16H 45/02* (2013.01); *F16H 2045/0284* (2013.01)

(58) Field of Classification Search
CPC ........ F16D 13/52; F16D 13/648; F16D 13/69; F16H 45/02; F16H 2045/0284
See application file for complete search history.

(56) References Cited

U.S. PATENT DOCUMENTS 3,171,522 A * 3/1965 Petrie ...................... F16D 13/52
  192/70.28
3,994,378 A * 11/1976 Schwabe ................. B60T 1/062
  192/70.28
(Continued)

FOREIGN PATENT DOCUMENTS

DE   10 2008 062 645   6/2010
DE   10 2013 220 265   4/2014
(Continued)

*Primary Examiner* — Charles A Fox
*Assistant Examiner* — Lori Wu
(74) *Attorney, Agent, or Firm* — Cozen O'Connor

(57) ABSTRACT

A clutch arrangement is formed with drive-side and, output-side clutch elements and a clutch piston for operative connection and disengagement between the drive-side and output-side clutch elements. Associated with at least two clutch elements is an elastically deformable clutch element working mechanism through which the corresponding clutch elements can be acted upon in direction away from one another by an axial force to assist disengagement of the drive-side and output-side clutch elements. The clutch element working mechanism provides a considerable change in the gradient of the axial force exerted on the clutch elements as a result of even a small change of shape of the clutch element working mechanism so that a sharply rising axial force of the clutch element working mechanism works against the clutch piston.

11 Claims, 9 Drawing Sheets

(51) Int. Cl.
   *F16D 13/52*     (2006.01)
   *F16H 45/02*     (2006.01)

(56) References Cited

U.S. PATENT DOCUMENTS

| | | | |
|---|---|---|---|
| 6,508,337 B1 | 1/2003 | Esper | |
| 2012/0228077 A1* | 9/2012 | DeGowske | ........... F16D 13/648 |
| | | | 192/70.11 |

FOREIGN PATENT DOCUMENTS

| | | |
|---|---|---|
| GB | 614 913 | 12/1948 |
| JP | S51 119444 | 9/1976 |

* cited by examiner

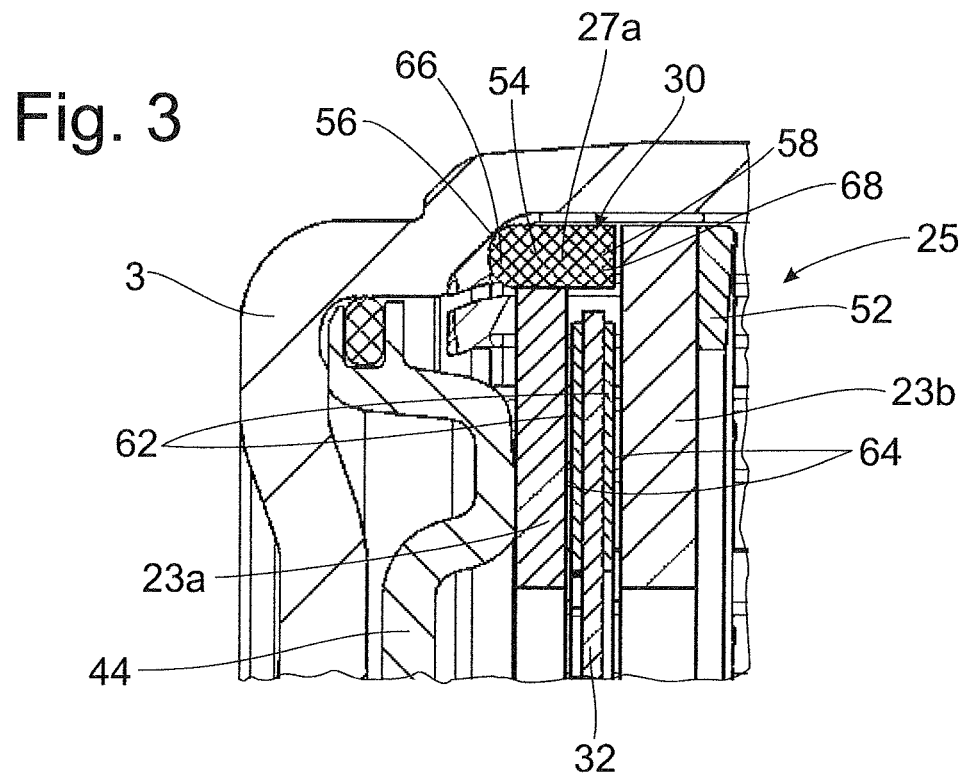
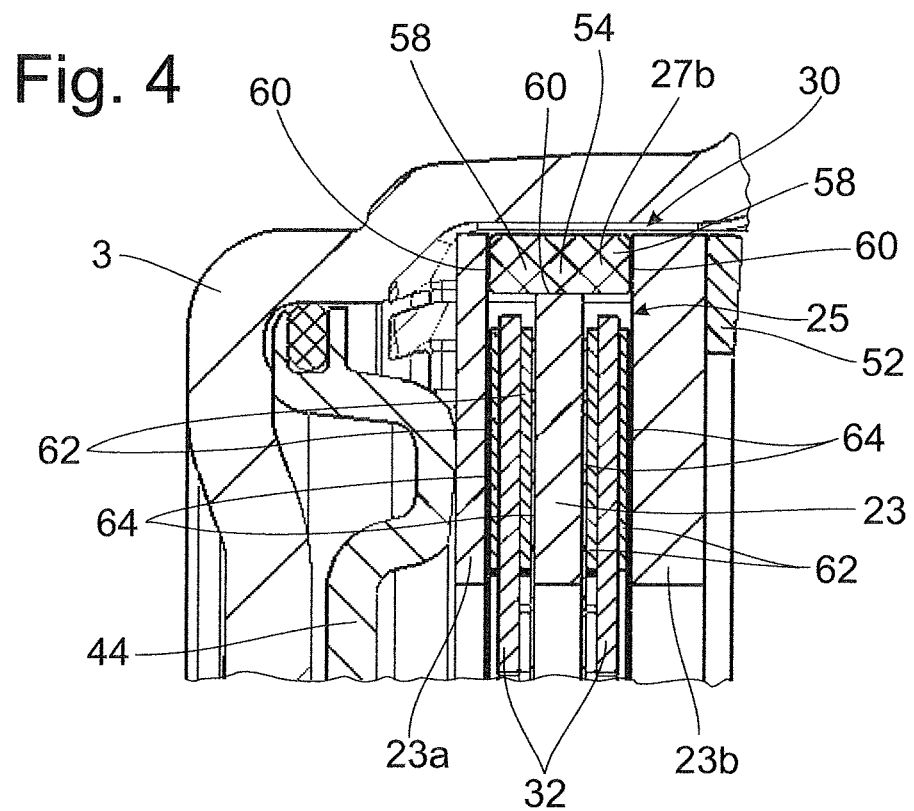

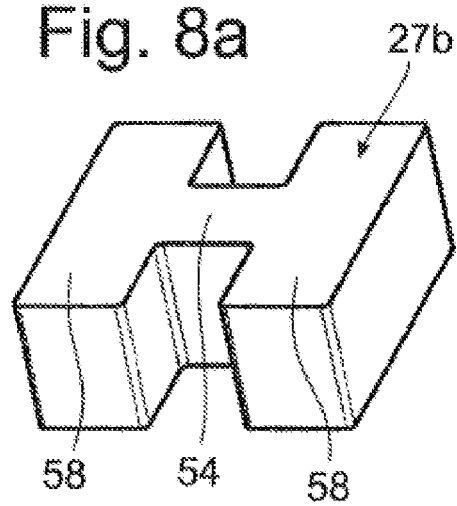
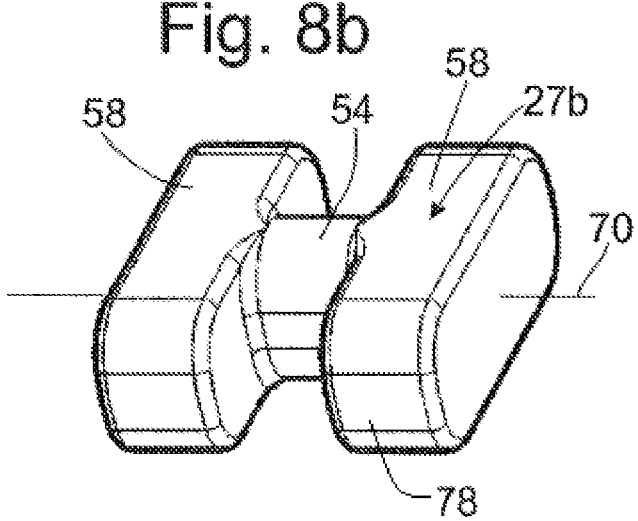
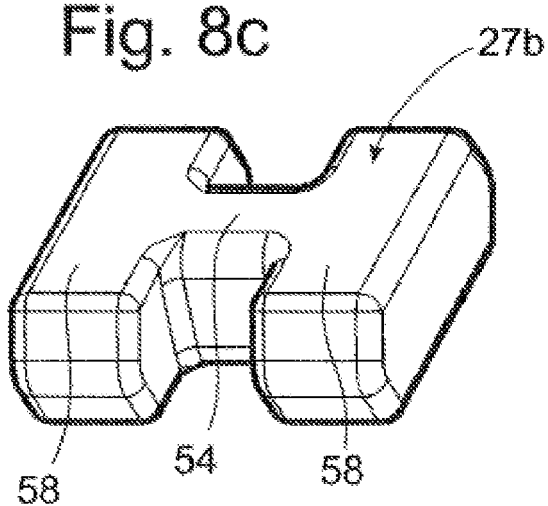
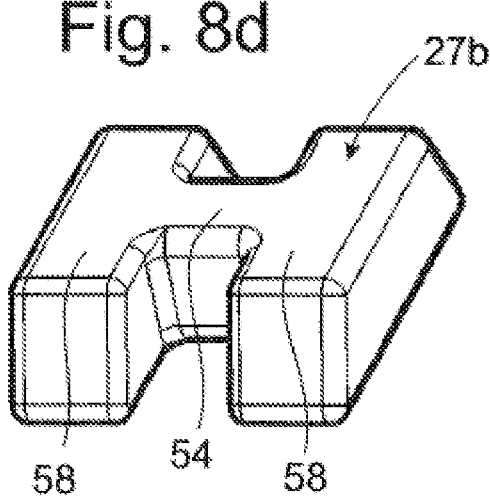
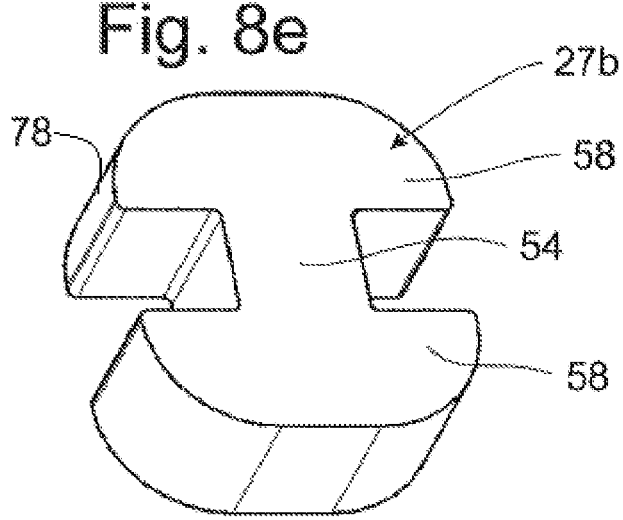

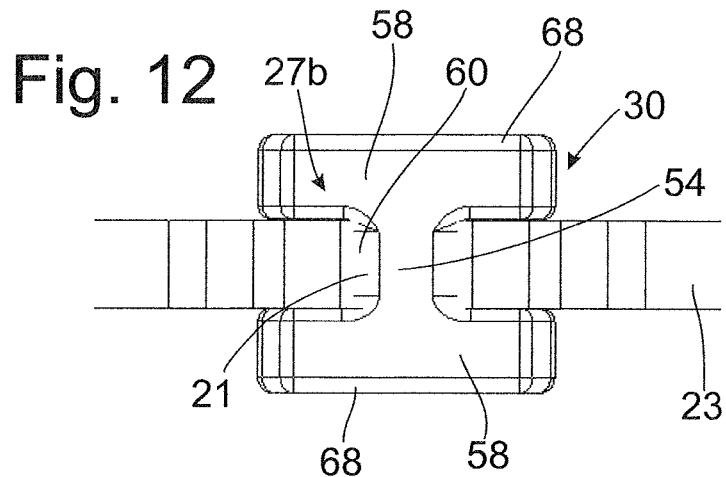
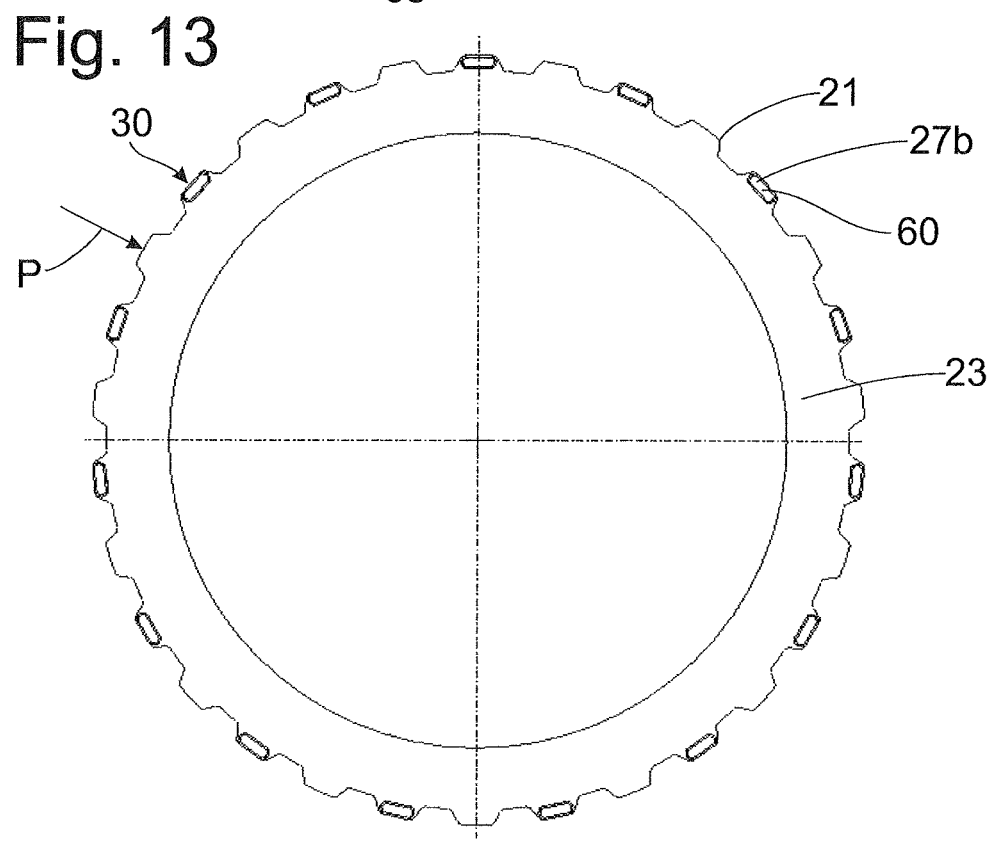
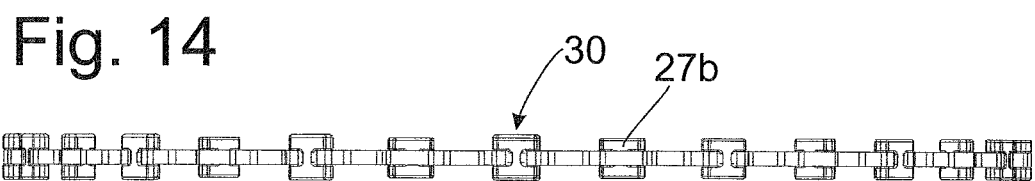

CLUTCH ASSEMBLY CONFIGURED TO PREVENT UNWANTED JOLT DURING ENGAGEMENT

CROSS REFERENCE TO RELATED APPLICATION

This is a U.S. national stage of application No. PCT/EP2016/068274, filed on Aug. 1, 2016. Priority is claimed on German Application No. DE102015216731.3, filed Sep. 2, 2015, the content of which is incorporated here by reference.

BACKGROUND OF THE INVENTION

1. Field of the Invention

The invention is directed to a clutch arrangement with drive-side clutch elements, output-side clutch elements, and a clutch piston through which an operative connection can be produced between the drive-side clutch elements and the output-side clutch elements for engagement and through which the operative connection between the drive-side clutch elements and the output-side clutch elements can be cancelled for disengagement. There is associated with at least two clutch elements an elastically deformable clutch element working mechanism through which the corresponding clutch elements can be acted upon in direction away from one another by an axial force so as to assist the cancellation of the operative connection between the drive-side clutch elements and the output-side clutch elements during disengagement.

2. Description of the Prior Art

A clutch arrangement of this kind configured as a lockup clutch of a hydrodynamic torque converter is known from DE 10 2008 220 062 645 A1. A plurality of drive-side clutch elements are connected via an outer toothing to a radially outer clutch element carrier so as to be fixed with respect to rotation but axially displaceable relative to it and receive axially therebetween output-side clutch elements which, in contrast to the drive-side clutch elements, are provided with friction linings on both sides. The output-side clutch elements are connected to a radially inner clutch element carrier, not shown, so as to be fixed with respect to rotation but axially displaceable relative to it. The clutch piston is provided axially between a cover of a housing and the drive-side clutch element arranged closest to this housing and, for transmitting a pressing force to the clutch elements, has a contact area by which it can be brought into contact with the adjacent drive-side clutch element.

An elastically deformable clutch element working mechanism is associated with the drive-side clutch elements. This clutch element working mechanism is fastened to one of the drive-side clutch elements and is capable of exerting an axial force on the respective drive-side clutch elements adjoining on both sides. This axial force is built up when the clutch piston brings the drive-side clutch elements closer to one another during engagement, and, in the process, an increasing preloading builds up at the clutch element working mechanism through shape change. During disengagement, this preloading causes the drive-side clutch elements to be operatively effected by the output-side clutch elements so that drag losses are prevented. The clutch element working mechanism preferably has elastomeric working elements.

While disengagement presents no problem, negative effects occur during engagement if the clutch arrangement is part of a hydrodynamic torque converter. The considerable difference in rate of rotation existing at the start of an engagement process between a drive-side hydrodynamic element such as an impeller wheel and a drive-side hydrodynamic element such as a turbine wheel manifests in reduced pressure in the hydrodynamic circuit and, therefore, in the formation of air bubbles that displace a portion of the fluid contained in the hydrodynamic circuit. If the pressure for engagement increases in the hydrodynamic circuit, the bubbles burst leaving a hydrodynamic circuit that is not sufficiently filled with fluid, and only a limited volume flow is available for refilling it. The lower pressure in the hydrodynamic circuit is counteracted by a pressure present with a high pressure difference in a pressure chamber which acts on the opposite side of the clutch piston and is located axially between the cover of the housing and the clutch piston. The clutch piston accordingly moves very spontaneously into its engagement position accompanied by an unwanted jolt.

A further clutch arrangement with a plurality of drive-side clutch elements and output-side clutch elements and with a clutch element working mechanism assisting the disengagement process is known from DE 10 2013 220 265 A1. Working elements of the clutch element working mechanism can be provided between all of the drive-side clutch elements or between all of the drive-side clutch elements, but they can also be provided between only some of the drive-side clutch elements or output-side clutch elements. Also, in this clutch arrangement there are no negative effects that occur during engagement and must be counteracted.

SUMMARY OF THE INVENTION

It is the object of one aspect of the invention to configure a clutch arrangement in such a way that an unwanted jolt is effectively prevented during engagement.

A clutch arrangement is provided with drive-side clutch elements, output-side clutch elements, and a clutch piston through which an operative connection can be produced between the drive-side clutch elements and the output-side clutch elements for engagement and through which the operative connection between the drive-side clutch elements and the output-side clutch elements can be cancelled for disengagement. There is associated with at least two clutch elements an elastically deformable clutch element working mechanism through which the corresponding clutch elements can be acted upon in direction away from one another by an axial force so as to assist the cancellation of the operative connection between the drive-side clutch elements and the output-side clutch elements during disengagement.

Further, the clutch element working mechanism is configured such that there is a considerable change in the gradient of the axial force exerted on the clutch elements as a result of even a small change of shape of the clutch element working mechanism so that a sharply rising axial force of the clutch element working mechanism works against the clutch piston the closer it gets to its engagement position.

If the clutch arrangement is part of a hydrodynamic torque converter, there can occur the above-described effect that air bubbles that have formed under reduced pressure in the hydrodynamic circuit burst during the pressure buildup required for engagement and accordingly cause a hydrodynamic circuit to be only insufficiently filled with fluid and can result in a considerable pressure difference between the latter and a pressure chamber. However, a pressure increase caused in this way at the clutch piston in direction of its engagement position is counteracted by the clutch element working mechanism, namely, because of its characteristic with a substantial change in the gradient during a change in shape in that the clutch element working mechanism increasingly resists the pressure increase at the clutch piston directed in engagement direction and accordingly efficiently counteracts the pressure increase at the clutch piston in engagement direction. In this way, the engagement process is effected without jolts even with a very high gradient of the pressure difference between the hydrodynamic circuit and the associated pressure chamber.

Ideally, the clutch element working mechanism is arranged at the clutch arrangement with a radial offset relative to a contact zone provided at the clutch piston, and the contact zone protrudes in direction of a clutch element which is adjacent in the engagement direction or disengagement direction. If the clutch element in this type of arrangement of the clutch element working mechanism is provided with a small cross section in engagement direction or disengagement direction, a change in the axial force exerted on the clutch element during the engagement process or disengagement process brings about a change in shape at the clutch element, which results in a change in the effective friction radius between the contact zone of the clutch piston and the clutch element. This can be exploited in the following way:

By arranging the clutch element working mechanism in the radially outer circumferential region of those clutch elements, which are arranged radially outside of radially inner clutch elements, and by forming the contact zone at the clutch piston radially inside of the clutch element working mechanism, in this instance preferably in the area of the mean friction radius of the clutch piston, the radially outer clutch element axially adjacent to the clutch piston is deformed such that this clutch element enters into contact by its radially inner region with the axially adjacent, radially inner clutch element. This shifts the effective friction radius very far radially inward so that the torque increase transmitted via the clutch arrangement is comparatively slight during a spontaneous pressure increase at the clutch piston in engagement direction. A further increasing pressing force at the clutch piston causes a realignment of the radially outer clutch element axially adjacent to the clutch piston such that the deformation of the clutch element declines and the effective friction radius is shifted radially outward approximately to the radial level of the contact zone at the clutch piston. Accordingly, the ability of the clutch arrangement to transmit torque increases appreciably. Overall, the torque buildup at the clutch arrangement can be advantageously influenced in this way for preventing a jolt.

In order to implement the clutch element working mechanism at the clutch arrangement, preferably clutch elements are provided which have at one of their radial circumferential regions, i.e., ideally radially outwardly in case of radially outer clutch elements or ideally radially inwardly in case of radially inner clutch elements, a toothing for rotatably connecting to a clutch element carrier, and preferably a clutch element working mechanism is provided which has a plurality of deformation elements inserted in axial direction between teeth of clutch elements. In this respect, each individual deformation element is configured in such a way that there is considerable change in the gradient of the axial force exerted on the clutch elements as a result of even a slight change in shape at the deformation elements. As a result, a sharply rising axial force of the deformation elements acts against the clutch piston during a rising pressure increase in its engagement position. The deformation elements are preferably received at the toothing of the respective clutch element by means of a loss prevention arrangement.

Of course, all of the deformation elements can be provided with deformation regions in running direction of median axes which are parallel to the central axis and proceeding in each instance from their receiving region which engages in a cutout of the respective clutch element, all of which deformation regions have at least substantially identical dimensions. However, also at least some of the deformation elements can be provided with deformation regions in running direction of the respective median axis and proceeding from their receiving region engaging in a cutout of the respective clutch element, at least one of which deformation regions is dimensioned smaller than at least one further deformation region.

The deformation regions having the smaller dimensions can bring about at least an axial locking of the deformation element in one of the two possible running directions of the central axis. The identically dimensioned deformation regions are configured such that there is considerable change in the gradient of the axial force exerted on the adjacent clutch elements as a result of even a slight change in shape at the deformation regions.

Depending on the axial force exerted on the adjacent clutch elements, influence can be exerted on the quantity of deformation elements. An arrangement which is uniformly distributed in circumferential direction is recommended.

If deformation elements with identically dimensioned deformation regions are combined with deformation elements having different deformation regions, the latter are preferably used in case of an odd number of clutch elements in that deformation elements which have differently dimensioned deformation regions are associated with at least one clutch element or odd plurality of clutch elements, while deformation elements having identically dimensioned deformation regions are associated with an even plurality of clutch elements. A further use for such a combination of deformation elements exists when the axial ends of the respective identically dimensioned deformation regions come in contact with an adjacent clutch element, while the axial ends of the respective smaller dimensioned deformation regions come in contact with the axial ends of adjacent deformation regions which are likewise smaller-dimensioned.

The shape of the receiving region of the respective deformation elements is at least substantially adapted to the shape of the toothing which brings the clutch elements into rotational connection with clutch element carriers.

BRIEF DESCRIPTION OF THE DRAWINGS

The clutch arrangement will be described in the following referring to embodiment examples. The drawings show:

FIG. 3 is an enlarged detail of the clutch arrangement formed with two friction regions;

FIG. 4 is like FIG. 3, but with the clutch arrangement formed with four friction regions;

FIGS. 8a-8e are like FIGS. 6a-6f, but with deformation regions of like dimensioning adjoining a receiving region on both sides;

FIG. 12 is like FIG. 9, but for a deformation element according to FIGS. 8a-8e;

FIG. 13 is like FIG. 10, but for a deformation element according to FIGS. 8a-8e;

FIG. 14 is like FIG. 11, but for a deformation element according to FIGS. 8a-8e;

DETAILED DESCRIPTION OF THE PRESENTLY PREFERRED EMBODIMENTS

Figure 1:
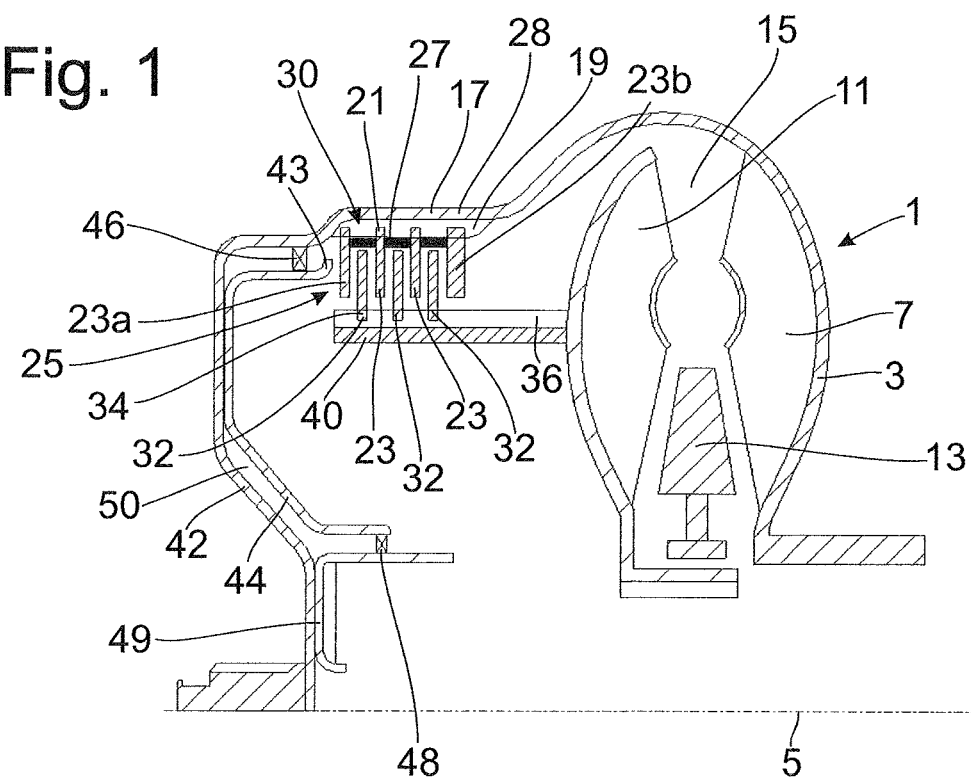
FIG. 1 is a cross section through a clutch arrangement with deformation elements of a clutch element working mechanism received axially between drive-side clutch elements, the clutch arrangement being received in a housing of a hydrodynamic torque converter which is shown schematically.

FIG. 1 schematically shows a hydrodynamic torque converter 1 which has a housing 3 rotatable around a central axis 5. The housing 3 receives an impeller wheel 7 that cooperates with a turbine wheel 11. A stator wheel 13 is provided axially between the impeller wheel 7 and the turbine wheel 11. A hydrodynamic circuit 15 is formed by the impeller wheel 7, turbine wheel 11 and stator wheel 13.

At the inner side of an at least substantially straight-line outer wall 17, the housing 3 has an inner toothing 19 that meshingly engages with outer teeth 21 at drive-side clutch elements 23a, 23, 23b, by which the drive-side clutch elements 23a, 23, 23b are connected to the housing 3 so as to be axially displaceable but fixed with respect to rotation relative to it. Accordingly, the housing 3 acts as drive-side clutch element carrier 28 for the drive-side clutch elements 23a, 23, 23b. A deformation element 27, which is incorporated in corresponding recesses of the drive-side clutch elements 23a, 23, 23b in a manner which is not shown, acts in each instance axially between the individual clutch elements 23a, 23, 23b. The deformation elements 27 are part of a clutch element working mechanism 30 that will be described more fully in the following.

Two drive-side clutch elements 23a, 23, 23b are provided in each instance at both sides of each output-side clutch element 32. Owing to their being arranged farther radially outward compared to the output-side clutch elements 32, the drive-side clutch elements 23a, 23, 23b can also be referred to as radially outer clutch elements and, conversely, the output-side clutch elements 32 can be referred to as radially inner clutch elements. The radially inner clutch elements 32 are formed with an inner toothing 34 that forms a toothed connection with an outer toothing 36 of an output-side clutch element carrier 40, by which toothed connection the output-side clutch elements 32 are received at the clutch element carrier 40 so as to be axially displaceable but fixed with respect to rotation.

The drive-side clutch element 23a which has approached closest to a drive-side housing cover 42 of housing 3 can be acted upon by an axial force through a contact zone 43 of a clutch piston 44. This axial force is received by the drive-side clutch element 23b farthest away from the housing cover 42, this drive-side clutch element 23b being axially supported at housing 3 by a supporting ring 52 (FIG. 3 or 4).

The clutch piston 44 together with the drive-side clutch elements 23a, 23, 23b and the output-side clutch elements 32 forms a clutch arrangement 25. The clutch piston 44 is received directly at the housing 3 on the radially outer side by a first bearing 46, but is received indirectly by the housing 3 on the radially inner side by a second bearing 48 via a piston carrier 49. The piston carrier 49 is fastened to the drive-side housing cover 42.

Together with the drive-side housing cover 42, the clutch piston 44 defines a pressure chamber 50. Like the hydrodynamic circuit 15, this pressure chamber 50 is connected to an external pressure supply, not shown. If the pressure supply in the hydrodynamic circuit 15 generates a positive pressure relative to the pressure chamber 50, the clutch piston 44 is in its disengagement position, shown in FIG. 1, in which the drive-side clutch elements 23a, 23, 23b and the output-side clutch elements 32 are separated from one another, and the clutch arrangement 25 is not enabled for torque transmission.

On the other hand, if the pressure supply in the pressure chamber 50 increases beyond the pressure present in the hydrodynamic circuit 15, the clutch piston 44 is moved out of its disengagement position shown in FIG. 1 into an engagement position in which the clutch piston 44 comes in contact by its contact zone 43 with the adjacent drive-side clutch element 23a and transmits an axial force to the latter. The drive-side clutch element 23a transmits this axial force via the drive-side clutch elements 23 and the output-side clutch elements 32 to the final drive-side clutch element 23b viewed in running direction of the central axis 5, which final drive-side clutch element 23b is axially supported for this purpose at the drive-side clutch element carrier 28 by the supporting ring 52 (FIG. 3 or FIG. 4) incorporated in the toothing 19. The drive-side clutch elements 23a, 23 and 23b are brought into frictional connection with the output-side clutch elements 32 through the axial force applied by the clutch piston 44 so that a torque guided from the housing 3 via the drive-side clutch element carrier 28 to the drive-side clutch elements 23a, 23 and 23b is transmitted via the output-side clutch elements 32 and the output-side clutch element carrier 40 to the turbine wheel 11 and from there to an output, not shown, e.g., a transmission input shaft for co-rotation with the turbine wheel 11.

As soon as there is pressure supply in the pressure chamber 50 and the clutch piston 44 is moved into its engagement position in which it transmits an axial force to the clutch elements 23a, 23, 23b and 32 to produce a frictional connection between the clutch elements 23a, 23, 23b and 32, a compression of the deformation elements 27 of the clutch element working mechanism 30 begins upon impingement of these deformation elements 27. The deformation elements 27 and, therefore, the clutch element working mechanism 30 in its entirety are configured such that there is already a substantial change in the gradient of the axial force exerted on the clutch elements 23a, 23, 23b with even a slight change in shape, so that a sharply rising axial force of the deformation elements 27 and, therefore, of the clutch element working mechanism 30 opposes the clutch piston 44 with increasing proximity to its engagement position.

Since the clutch arrangement 25 is part of the hydrodynamic torque converter 1, there can be the effect, which has already been described, that air bubbles which have formed under reduced pressure in the hydrodynamic circuit 15 burst during the pressure buildup required for reaching the engagement position and accordingly cause the hydrodynamic circuit 15 to be only insufficiently filled with fluid and can result in a considerable pressure difference between the latter and the pressure chamber 50. However, a pressure increase caused in this way at the clutch piston 44 in direction of its engagement position is counteracted by the clutch element working mechanism 30, namely, because of its characteristic with a substantial change in the gradient during a change in shape in that the clutch element working mechanism 30 increasingly resists the pressure increase at the clutch piston 44 directed in engagement direction and accordingly efficiently counteracts the pressure increase at the clutch piston 44 in engagement direction. In this way, the engagement process is effected without jolts even with a very high gradient of the pressure difference between the hydrodynamic circuit 15 and the associated pressure chamber 50.

As is further shown in FIG. 1, the clutch element working mechanism 30 is arranged at the clutch arrangement 25 with a radial offset relative to the contact zone 43, which is provided at the clutch piston 44. A change in the axial force exerted on the clutch element 23a during the engagement process or disengagement process brings about a change in shape at the clutch element 23a, which results in a change in the effective friction radius between the contact zone 43 of the clutch piston 44 and the clutch element 23a. This can be exploited in the following way:

By arranging the clutch element working mechanism 30, for example, in the radially outer circumferential area of the drive-side—and, therefore, radially outer—clutch elements 23a, 23, 23b and by forming the contact zone 43 at the clutch piston 44 radially inside of the deformation elements 27 of the clutch element working mechanism 30, preferably in the region of the mean friction radius of the clutch piston 44, the radially outer clutch element 23a axially adjacent to the clutch piston 44 deforms in such a way that the radially inner region of this clutch element 23a contacts the axial adjacent output-side—and, therefore, radially inner—clutch element 32. In this way, the effective friction radius is shifted very far radially inward so that the torque rise transmitted via the clutch arrangement 25 during a spontaneous rise in pressure at the clutch piston 44 in the engagement direction is comparatively slight. A continued rising pressing force at the clutch piston 44 causes the drive-side clutch element 23a axially adjacent to the clutch piston 44 to be realigned such that its deformation goes back and the effective friction radius shifts radially outward, approximately to the radial level of the contact zone 43 at the clutch piston 44. Accordingly, the capacity of the clutch arrangement 25 to transmit torque increases appreciably. Altogether, the torque buildup at the clutch arrangement can be advantageously influenced in this way to prevent a jolt.

When the clutch piston 44 is moved back into its disengagement position during a relief of pressure in the pressure chamber 50 and during a pressure buildup in the hydrodynamic circuit 15, the axial force transmitted from the clutch piston 44 to clutch elements 23a, 23, 23b and 32 is initially reduced and, finally, cancelled. In order to completely cancel the friction connection between clutch elements 23a, 23, 23b and 32, which exists in the engagement position, the deformation elements 27 of the clutch element working mechanism 30 generate an axial force when relieved of load, which axial force acts between the clutch elements 23a, 23, 23b and assists the clutch elements 23a, 23, 23b in separating axially from one another and from clutch elements 32. This effectively prevents drag losses which would otherwise occur due to co-rotating clutch elements.

Figure 2:
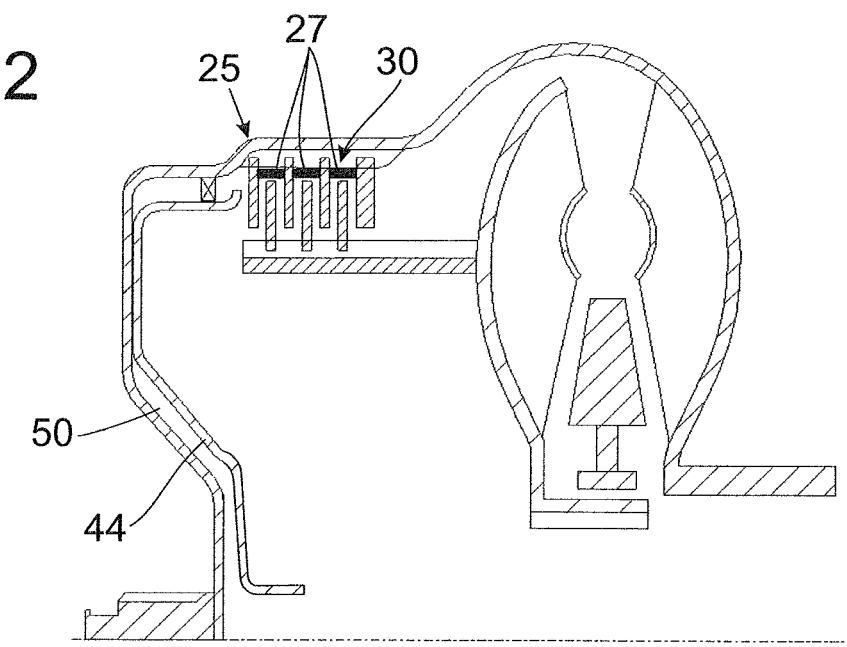
FIG. 2 is like FIG. 1, but with a radially larger piston.

Before addressing specific configurations of deformation elements 27 of clutch element working mechanism 30, it should be noted that, according to FIG. 2, the clutch piston 44 can be enlarged in radial direction in that it is drawn farther radially inward while omitting the piston carrier 49 shown in FIG. 1. As a result of the larger surface of the clutch piston 44 relative to the clutch piston shown in FIG. 1, a lower pressure is required in the pressure chamber 50 for achieving a comparable axial force, which improves energy efficiency, or, with comparably high pressure in the pressure chamber 50, a higher axial force can be generated through the clutch piston 44, and, therefore, the torque that can be transmitted through the clutch arrangement 25 can be increased. The deformation elements 27 of the clutch element working mechanism 30 act against an overall poorer adjustability of a radially larger clutch piston 44.

Referring to an enlarged detail of a clutch arrangement 25 formed with only two friction regions 64, FIG. 3 shows deformation elements 27a of a clutch element working mechanism 30 in a different construction compared to the deformation elements 27 in FIG. 1. According to FIG. 6b, the deformation element 27a shown in FIG. 3 is formed with a receiving region 54 in its axial central area, this receiving region 54 being adjoined at both sides by a deformation region 56, 58, respectively. The two deformation regions 56, 58 are dimensioned differently, deformation region 58 being larger in axial direction than deformation region 56. The two deformation regions 56, 58 and the receiving region 54 extend in each instance along a median axis 70 whose running direction is at least substantially parallel to the running direction of the central axis 8.

Figure 9:
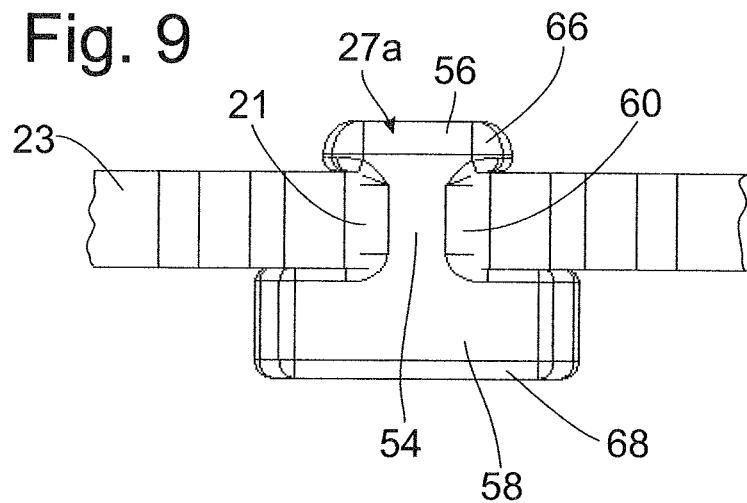
FIG. 9 is a diagram showing the connection of the cutout and the receiving region for a deformation element in accordance with FIGS. 6a-6f.
Figure 10:
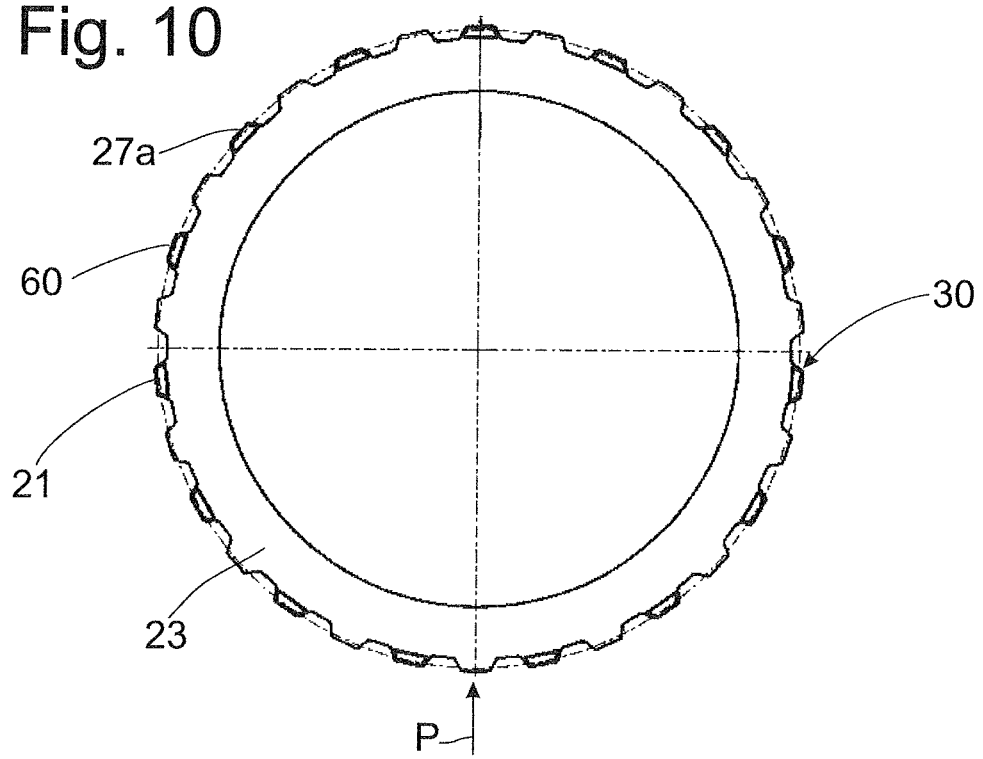
FIG. 10 is a diagram showing a complete clutch element in the configuration according to FIG. 9.
Figure 11:
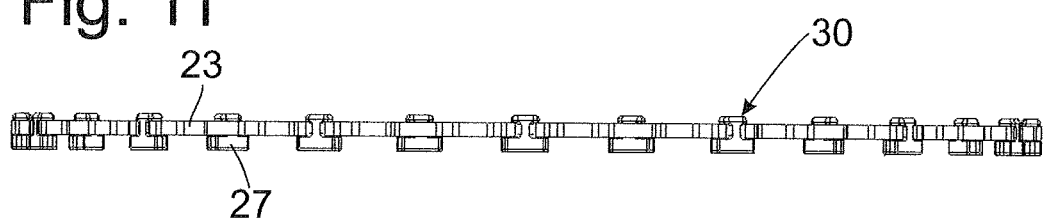
FIG. 11 is like FIG. 10, but viewed in the direction of arrow P in FIG. 10.

As is shown in more detail in FIG. 9, the deformation element 27a extends with its receiving region 54 through a cutout 60 provided for this purpose in the respective clutch element 23a, 23, 23b which, in the view in FIG. 3, is the drive-side clutch element 23a. Both deformation region 56 and deformation region 58 are formed with a larger cross section compared to cutout 60 so that the deformation element 27a is received at the clutch element 23a so as to be prevented from falling out axially. As is shown in FIG. 10, the deformation elements 27a are received in a cutout 60 in each instance at clutch element 23a, 23, or 23b in the radially outer region, i.e., at the toothing 21. In the present embodiment, it is sufficient for a cutout 60 to be associated with every second tooth of the toothing 21 in circumferential direction. The quantity of deformation elements 27a can be increased for the sake of a higher axial force acting against the clutch piston 44, whereas the quantity of deformation elements 27a can be reduced for purposes of a smaller axial force acting against the clutch piston 44. FIG. 11 shows the clutch element working mechanism 30 from the viewing direction represented by arrow P in FIG. 10.

As can be seen in FIG. 3, the deformation region 56 in the present configuration with smaller dimensioning in running direction of the median axis 70, hereinafter "axial direction" for the sake of brevity, in addition to the above-mentioned function of axial loss prevention by its axial end 66, also serves to axially limit the displacement of the clutch element 23a relative to the housing 3. In contrast, the axial end 68 with greater dimensioning in axial direction which is provided at the deformation region 58 can be brought into contact with the adjacent radially outer clutch element 23b along the path of the clutch piston 44 in the engagement position thereof so that the deformation elements 27a can carry out their function, already described, of improving the adjusting process during engagement. In FIG. 3, the section through the deformation element 27a runs along the median axis 70 (FIG. 6b) so that different dimensions of the deformation regions 56 and 58 and of the receiving region 54 transverse to the running direction of the median axis 70 are not visible.

Referring to FIG. 3, it is further noted that the drive-side clutch elements 23a and 23b are formed as simple steel plates, while the output-side clutch element 32 provided between clutch elements 23a and 23b is formed with friction linings 62 at both sides and accordingly serves as friction plate. Given that the clutch piston 44 approaches the engagement position, there is a friction surface 64 available in each instance between each of the two drive-side clutch elements 23a, 23b and each friction lining 62 of the output-side clutch element 32.

Figure 7A:
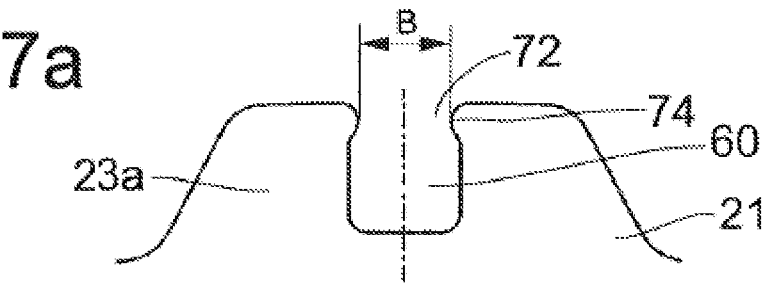
FIGS. 7a-7d are shapes for the respective cutouts that receive the receiving region of a deformation element.
Figure 7B:
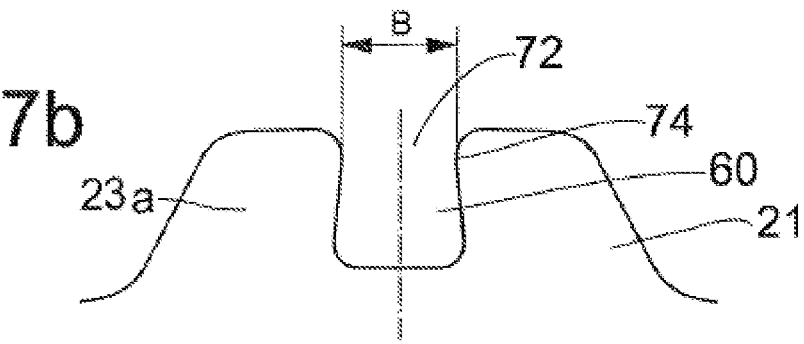
Figure 7C:
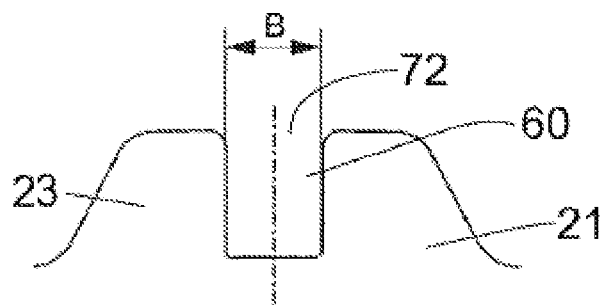
Figure 7D:
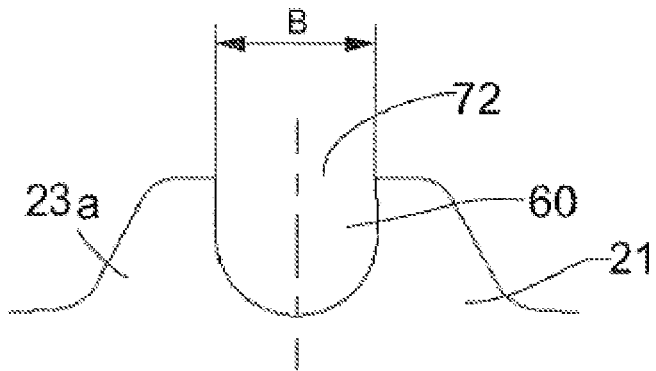

It should be noted with respect to the cutouts 60 at the toothing 21 of clutch element 23a in FIG. 3 that these cutouts 60 in accordance with FIG. 7c or FIG. 7d have an entrance 72 in the radial outer area for the receiving region 54 of the respective deformation element 27a, 27, 27b with a width B which is not exceeded within the radial extension of the cutout 60. Consequently, the receiving region 54 of the respective deformation element 27a, 27, 27b is simply to be inserted. In case of deformation elements 27a, 27, 27b with a receiving region 54, which is angular in cross section, a cutout in accordance with FIG. 7c is provided, whereas in case of deformation elements 27a, 27, 27b with a receiving region 54, which is round in cross section, a cutout according to FIG. 7d is provided.

In contrast to the foregoing, the cutouts 60 according to FIG. 7a or FIG. 7b have in each instance in the radial outer area an entrance 72 for the receiving region 54 of the respective deformation element 27a, 27, 27b with a width B which is smaller than the circumferential dimension of cutout 60 within the radial extension thereof. The smaller width B results from a radial loss prevention arrangement 74 which engages behind the receiving region 54 of the deformation element 27a, 27, 27b and makes the entrance 72 narrower. In FIG. 7a, only entrance 72 is narrowed in cutout 60, whereas in FIG. 7b the cutout 60 widens in radially inward direction.

Figure 6A:
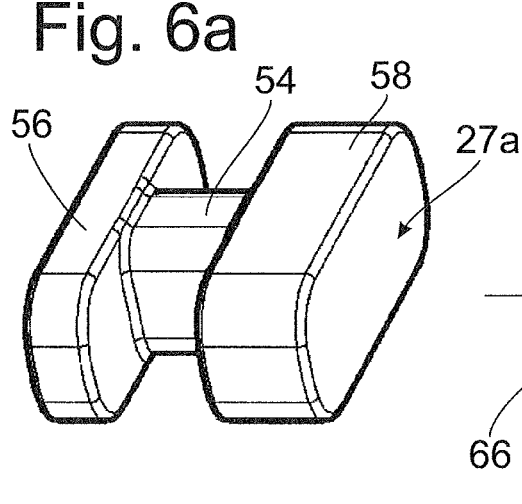
FIGS. 6a-6f are details of deformation elements of the clutch element working mechanism with a receiving region and deformation regions of unlike dimensioning which adjoin the latter on both sides.
Figure 6B:
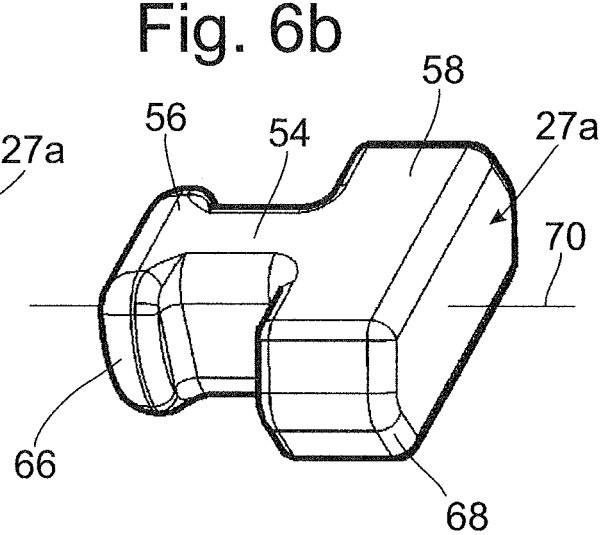

In the embodiment of the deformation element 27a according to FIG. 6b which is described in connection with FIG. 3, the deformation regions 56, 58 are formed with unequal dimensioning not only in running direction of median axis 70 but also in an extension direction perpendicular to the running direction of median axis 70. A configuration of the deformation region 56 with the smaller dimensioning also perpendicular to the median axis 70 is advantageous when this deformation region 56 exclusively has the functions of loss prevention and, where applicable, limiting axial displacement. On the other hand, if the deformation region 56 with the smaller dimensioning is also allotted the function of improving the adjusting process during engagement, then a configuration such as that shown in FIG. 6a with a deformation region 56, which extends just as far transverse to the running direction of the median axis 70 as the deformation region 58 with the larger dimensioning in axial direction can also be advantageous.

Figure 6C:
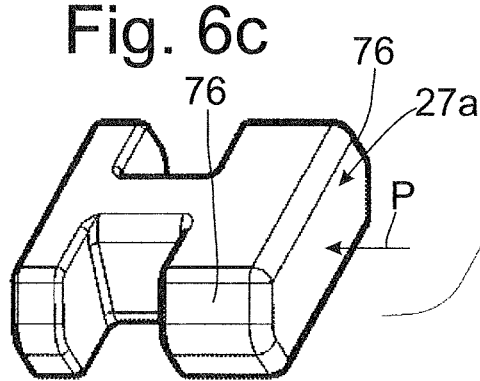
Figure 6D:
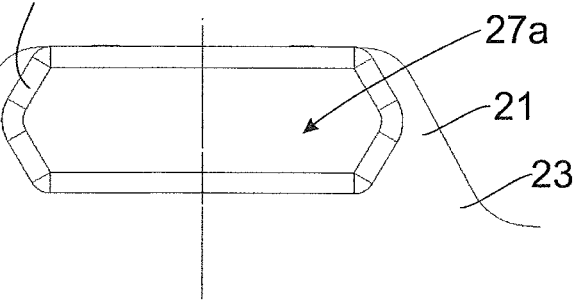
Figure 6E:
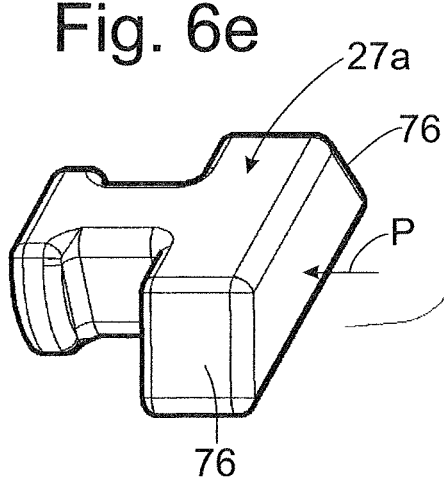
Figure 6F:
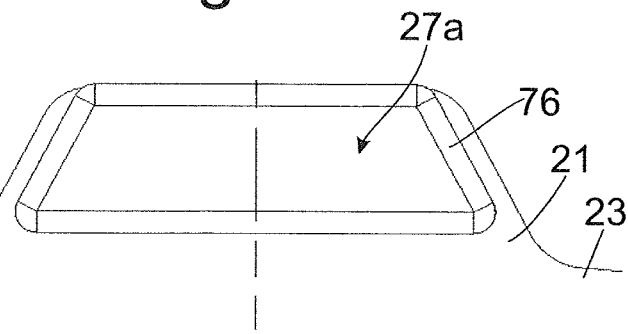

In the arrangement of the deformation element 27a in accordance with FIG. 6c, the deformation regions 56 and 58 are adapted by bevels 76 in the radial outer region to the shape of the toothing 21 of the clutch element 23a, 23, 23b receiving the deformation element 27a. This is clearly discernable from the illustration in FIG. 6d which shows the view of the clutch element 27a from the viewing direction indicated by an arrow P in FIG. 6c. This form of depiction was chosen for FIGS. 6e and 6f in which the bevels 76 at the respective deformation element 27a are continuous up to the radially inner regions thereof.

According to FIGS. 8a to 8e, comparable configurations of the deformation element 27 are provided when this deformation element 27 is formed in running direction of the median axis 70 exclusively with deformation regions 58 having the larger dimensioning. Accordingly, the deformation regions 58 have at least substantially identical lengths in running direction of the median axis 70. While FIG. 8a shows the deformation element 27b in which the receiving region 54 and deformation regions 58 are formed with edges, it will be seen that the deformation regions 58 in FIGS. 8b and 8e have rounded portions 78, while the receiving region 54 is rounded in FIG. 8b but has edges in FIG. 8e. To this extent, a receiving region 54 formed in accordance with FIG. 8b is suitable to be received in a cutout 60 in the toothing 21 such as that shown in FIG. 7d, while a receiving region 54 formed in accordance with FIG. 8e is suited to be received in a cutout 60 in toothing 21 such as that shown in FIG. 7c. It should be added with regard to the rounding of the deformation regions 58 in FIGS. 8b and 8e that, because of the rounding, deformation is initiated with low spring force and then increases markedly. In this way, a corresponding force-displacement characteristic line can be generated. Finally, the embodiments of the deformation elements 27b according to FIGS. 8c and 8d again have bevels 76 with which they are adapted to the shape of the toothing 21 of the clutch element 23a, 23, 23b receiving the deformation element 27b.

The configuration shown in FIG. 4 differs from the embodiment of the clutch arrangement 25 described up to this point referring to FIG. 3 in that, on the one hand, the clutch arrangement 25 is formed with four friction regions 64 and, on the other hand, the deformation regions 58 of the deformation elements 27b of the clutch element working mechanism 30 have the larger dimensions in axial direction and are accordingly at least substantially identically dimensioned. In this embodiment, as is shown in FIG. 12, the deformation element 27b extends with its receiving region 54 through a cutout 60 provided for this purpose in the toothing 21 of the clutch element 23, while the deformation regions 58 are formed with a larger cross section compared with the cutout 60 and, therefore, hold the deformation element 27b at the clutch element 23 so as to be axially secured. As is shown in FIG. 13, the deformation elements 27b are received at the clutch element 23 in the radially outer region, i.e., at toothing 21, in a cutout 60 in each instance. Also, in this embodiment, it is sufficient to allocate a cutout 60 to every second tooth of the toothing 21 in circumferential direction. FIG. 14 shows the clutch element working mechanism 30 from the viewing direction indicated by arrow P in FIG. 13.

The axial ends 68 provided at the deformation regions 58 can be brought in contact with the respective axially adjacent drive-side clutch element 23a, 23b along the path of the clutch piston 44 into the engagement position thereof so that the deformation elements 27b act against the clutch piston 44 and can therefore exercise their function of facilitating the adjusting process during engagement.

Also in the configuration according to FIG. 4, the drive-side clutch elements 23a, 23, 23b are formed as simple steel plates, while the output-side clutch elements 32 provided between clutch elements 23a and 23b are formed, respectively, with friction linings 62 on both sides and therefore serve as friction plates. Given that the clutch piston 44 approaches the engagement position, a friction surface 64 is available in each instance between each of the drive-side clutch elements 23a, 23, 23b and each friction lining 62 of the output-side clutch elements 32.

Figure 5:
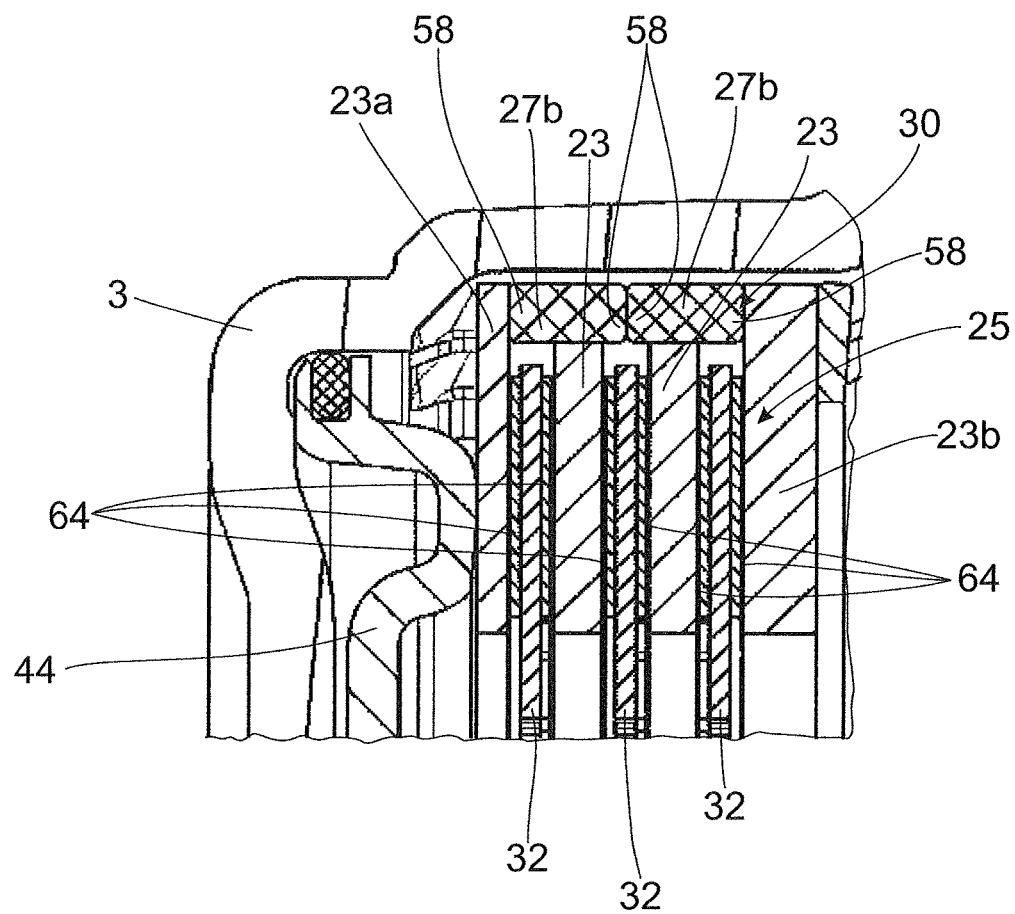
FIG. 5 is like FIG. 3, but with the clutch arrangement formed with six friction regions.

Finally, FIG. 5 shows a construction of the clutch arrangement 25 that is formed with six friction regions 64. Also in this construction, the deformation regions 58 of the deformation elements 27b of the clutch element working mechanism 30 are formed in each instance with larger dimensions and accordingly have at least substantially identical length in extension direction of the median axis 70. The deformation elements 27b extend with their receiving regions 54 through cutouts 60 provided for this purpose in the toothings 21 of the clutch element 23, while deformation regions 58 are formed with a larger cross section compared with the cutout 60 and, therefore, hold the deformation element 27b at the clutch elements 23 so as to be axially secured.

The axial ends 68 provided at the deformation regions 58 can be brought in contact with one another on the one hand and with the respective axially adjacent drive-side clutch element 23a, 23b on the other hand along the path of the clutch piston 44 into the engagement position thereof. In this way, the deformation elements 27b act against the engaging process of the clutch piston 44 and can therefore exercise their function of facilitating the adjusting process during engagement.

Figure 15:
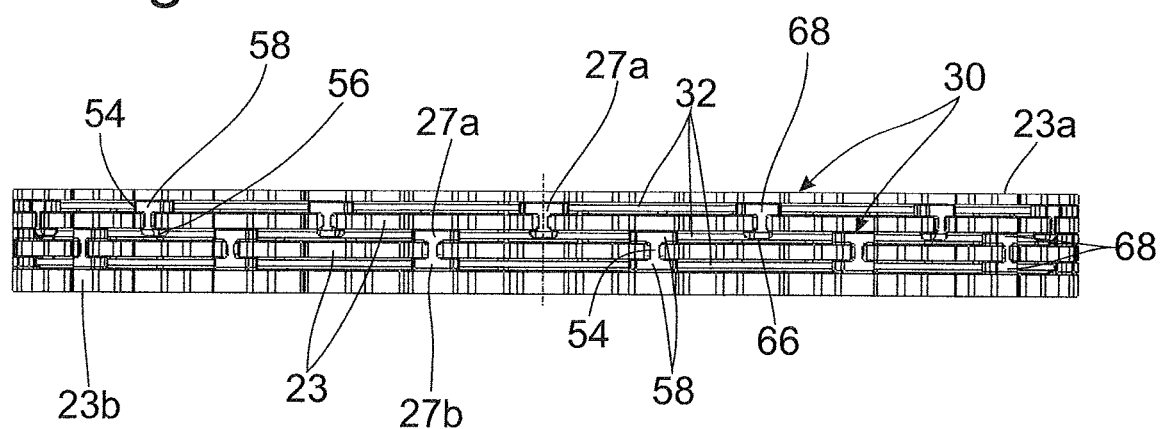
FIG. 15 is a diagram showing a plurality of clutch elements for a combination of deformation elements according to FIGS. 6a-6f and deformation elements according to FIGS. 8a-8e.

FIG. 15 shows a detail of the clutch arrangement 25 which substantially comprises clutch elements 23a, 23, 23b and 32 and clutch element working mechanism 30. While the drive-side clutch element 23 coming closest to the drive-side clutch element 23a is provided exclusively with deformation elements 27a in which a deformation region 58 with the larger dimensioning in axial direction adjoins the respective receiving region 54 at one end and a deformation region 56 with the smaller dimensioning in axial direction adjoins the respective receiving region 54 at the other end, the drive-side clutch element 23 coming closest to drive-side clutch element 23b has exclusively deformation elements 27b in which deformation regions 58 with the identical dimensioning in axial direction adjoin the respective receiving region 54. This refers to the larger dimensioning in axial direction. A combination of deformation elements 27a and 27b of such a kind is appropriate when there is an odd number of clutch elements 23a, 23, 23b, wherein the one deformation element 27a can take effect with its axial ends 68 at only one axial side, while the other deformation elements 27b can take effect with their axial ends 68 at two axial sides.

Figure 16:
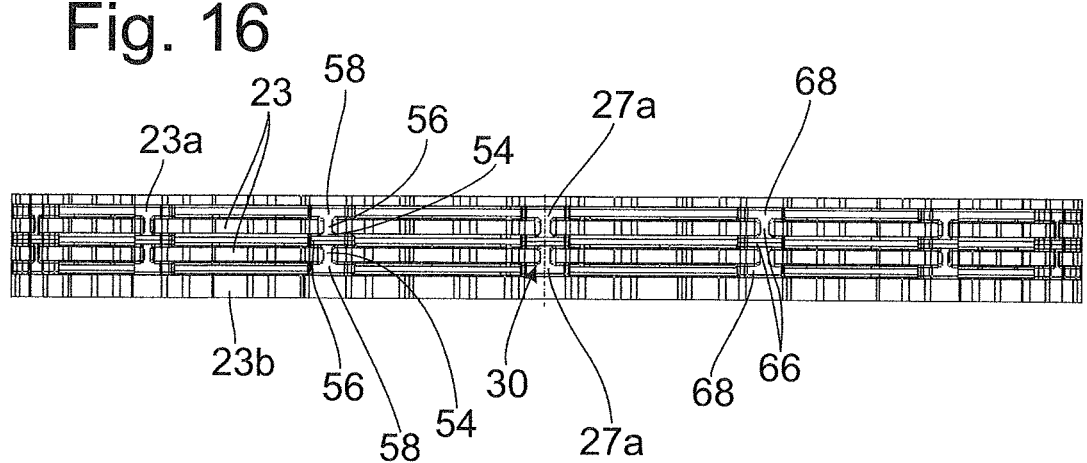
FIG. 16 is like FIG. 15, but with another combination of deformation elements according to FIGS. 6a-6f and FIGS. 8a-8e.

FIG. 16 is also a detail from the clutch arrangement 25 which basically shows clutch elements 23a, 23, 23b and 32 and clutch element working mechanism 30. At the drive-side clutch element 23 coming closest to the drive-side clutch element 23a and at the drive-side clutch element 23 coming closest to the output-side clutch element 23b, there are provided exclusively deformation elements 27a in which a deformation region 58 with the larger dimensioning in axial direction adjoins the respective receiving region 54 at one end and a deformation region 56 with the smaller dimensioning in axial direction adjoins the respective receiving region 54 at the other end. The deformation regions 56 with the smaller dimensioning in axial direction make contact in pairs with their axial ends 66, while the deformation regions 58 with the larger dimensioning in axial direction can be brought in contact by their axial ends 68 with the drive-side clutch element 23a, 23b coming closest.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A clutch arrangement comprising:
at least two drive-side clutch elements;
output-side clutch elements;
a clutch piston configured to produce an operative connection between the drive-side clutch elements and the output-side clutch elements and to disengage the operative connection between the at least two drive-side clutch elements and the output-side clutch elements; and
an elastically deformable clutch element working mechanism associated with the at least two clutch elements and configured to act upon the at least two clutch elements in a direction to separate the two drive-side clutch elements away from one another by an axial force to assist the disengagement of the at least two drive-side clutch elements and the output-side clutch elements;
wherein the clutch element working mechanism is configured such that there is a change in a gradient of the axial force exerted on the at least two clutch elements as a result of a change of shape of the clutch element working mechanism so that a rising axial force of the clutch element working mechanism works against the clutch piston as the clutch piston approaches an engagement position,
wherein the at least two drive-side clutch elements and the output-side clutch elements have at one of their radial circumferential regions a toothing for rotatably connecting to a clutch element carrier and the at least two drive-side clutch elements are rotatably connected with the clutch element working mechanism that has a plurality of deformation elements, each of which has a receiving region engaging in a cutout of a clutch element and deformation regions which adjoin the receiving region viewed in running direction of a median axis parallel to the central axis and which are provided for axial contact of the at least two drive-side clutch elements, and
wherein at least the deformation regions of each individual deformation element are configured in such a way that there is the change in the gradient of the axial force exerted on the clutch elements as a result of a change in shape at the deformation elements so that the rising axial force of the deformation elements acts against the clutch piston as the clutch piston moves increasingly closer to the engagement position, wherein the deformation elements which are provided with at least one deformation region in running direction of the respective median axis proceeding in each instance from their receiving region which engages in a cutout of a clutch element, wherein first deformation elements of the deformation elements having identically dimensioned deformation regions are arranged on both sides of the receiving region and second deformation elements of the deformation elements in which at least one deformation region has smaller dimensions than at least one of further deformation region and the deformation regions of the first deformation elements, wherein a combination of deformation elements with the identically dimensioned deformation regions and deformation elements with the at least one smaller-dimensioned deformation region are used with the clutch elements such that the deformation elements having, respectively, the identically dimensioned deformation regions come in contact by their axial ends with an adjacent clutch element, while the deformation elements formed with at least one smaller-dimensioned deformation region come in contact by their axial ends of their smaller deformation regions with the axial ends of deformation regions of respective adjacent deformation elements, which deformation regions are smaller-dimensioned.

2. The clutch arrangement according to claim 1, wherein the clutch element working mechanism is arranged with a radial offset relative to a contact zone provided at the clutch piston, wherein the contact zone protrudes in a direction of a respective clutch element that is adjacent in engagement direction or disengagement direction, and wherein the clutch element is provided with a cross section in the engagement direction or the disengagement direction so that a change in the axial force exerted on the clutch element during the engagement process or disengagement process brings about a change in shape at the clutch element, which results in a change in an effective friction radius between the contact zone of the clutch piston and the clutch element.

3. The clutch arrangement according to claim 1, wherein the deformation elements are received in a cutout of the toothing of the at least of one clutch element with the respective associated clutch element carrier and are secured against exiting from the cutout of the toothing by a loss prevention arrangement.

4. The clutch arrangement according to claim 3, wherein the respective cutout of the toothing receiving the deformation element has at least at an entrance for insertion of the deformation element at the loss prevention arrangement that engages the deformation element and which accordingly narrows the entrance.

5. The clutch arrangement according to claim 1, wherein the deformation regions having the smaller dimensions bring about at least an axial locking of the deformation element in one of two possible running directions of the respective median axis, while the deformation regions having the larger dimensions are configured such that there is a change in the gradient of the axial force exerted on the adjacent clutch elements as a result of a change in shape at the deformation regions.

6. The clutch arrangement according to claim 1, wherein a combination of deformation elements with the identically dimensioned deformation regions and the deformation elements with the at least one smaller-dimensioned deformation region are used with the clutch elements in case of an odd number of the clutch elements in that the deformation elements which have a smaller-dimensioned deformation region are associated with at least one clutch element or with an odd plurality of the clutch elements, while respective deformation elements having identically dimensioned deformation regions are associated with an even plurality of the clutch elements.

7. The clutch arrangement according to claim 1, wherein a shape of the receiving region of the respective deformation element is at least substantially adapted to the shape of the toothing.

8. A clutch arrangement comprising:

at least two drive-side clutch elements;

output-side clutch elements;

a clutch piston configured to produce an operative connection between the drive-side clutch elements and the output-side clutch elements and to disengage the operative connection between the at least two drive-side clutch elements and the output-side clutch elements; and an elastically deformable clutch element working mechanism associated with the at least two clutch elements and configured to act upon the at least two clutch elements in a direction to separate the two drive-side clutch elements away from one another by an axial force to assist the disengagement of the at least two drive-side clutch elements and the output-side clutch elements;

wherein the clutch element working mechanism is configured such that there is a change in a gradient of the axial force exerted on the at least two clutch elements as a result of a change of shape of the clutch element working mechanism so that a rising axial force of the clutch element working mechanism works against the clutch piston as the clutch piston approaches an engagement position, wherein the deformation elements are received in a cutout of the toothing of the at least of one clutch element with the respective associated clutch element carrier and are secured against exiting from the cutout of the toothing by a loss prevention arrangement, wherein the respective cutout of the toothing receiving the deformation element has at least at an entrance for insertion of the deformation element at the loss prevention arrangement that engages the deformation element and which accordingly narrows the entrance, wherein a combination of deformation elements with the identically dimensioned deformation regions and deformation elements with the at least one smaller-dimensioned deformation region are used with the clutch elements such that the deformation elements having, respectively, the identically dimensioned deformation regions come in contact by their axial ends with an adjacent clutch element, while the deformation elements formed with at least one smaller-dimensioned deformation region come in contact by their axial ends of their smaller deformation regions with the axial ends of deformation regions of respective adjacent deformation elements, which deformation regions are smaller-dimensioned.

9. The clutch arrangement according to claim 8,
wherein the at least two drive-side clutch elements and the output-side clutch elements have at one of their radial circumferential regions a toothing for rotatably connecting to a clutch element carrier and the at least two drive-side clutch elements are rotatably connected with the clutch element working mechanism that has a plurality of deformation elements, each of which has a receiving region engaging in a cutout of a clutch element and deformation regions which adjoin the receiving region viewed in running direction of a median axis parallel to the central axis and which are provided for axial contact of the at least two drive-side clutch elements, and
wherein at least the deformation regions of each individual deformation element are configured in such a way that there is the change in the gradient of the axial force exerted on the clutch elements as a result of a change in shape at the deformation elements so that the rising axial force of the deformation elements acts against the clutch piston as the clutch piston moves increasingly closer to the engagement position.

10. The clutch arrangement according to claim 8, wherein the deformation elements which are provided with at least one deformation region in running direction of the respective median axis proceeding in each instance from their receiving region which engages in a cutout of a clutch element, wherein first deformation elements of the deformation elements having identically dimensioned deformation regions are arranged on both sides of the receiving region and second deformation elements of the deformation elements in which at least one deformation region has smaller dimensions than at least one of further deformation region and the deformation regions of the first deformation elements.

11. The clutch arrangement according to claim 10, wherein the deformation regions having the smaller dimensions bring about at least an axial locking of the deformation element in one of two possible running directions of the respective median axis, while the deformation regions having the larger dimensions are configured such that there is a change in the gradient of the axial force exerted on the adjacent clutch elements as a result of a change in shape at the deformation regions.

\* \* \* \* \*